US009128733B2

(12) United States Patent
Taron (10) Patent No.: US 9,128,733 B2
(45) Date of Patent: Sep. 8, 2015

(54) DISPLAY AND RESOLUTION OF INCOMPATIBLE LAYOUT CONSTRAINTS

(75) Inventor: Michael Eugene Taron, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 681 days.

(21) Appl. No.: 12/945,665

(22) Filed: Nov. 12, 2010

(65) Prior Publication Data
US 2012/0124492 A1  May 17, 2012

(51) Int. Cl.
*G06F 3/00* (2006.01)
*G06F 3/0481* (2013.01)
*G06F 9/44* (2006.01)
*G06F 9/455* (2006.01)
*G06F 15/04* (2006.01)
*G06F 17/00* (2006.01)
*G06F 17/10* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 17/50* (2006.01)

(52) U.S. Cl.
CPC .................... *G06F 9/4443* (2013.01)

(58) Field of Classification Search
CPC ....... G06F 3/0481; G06F 8/38; G06F 9/4443; G06F 17/212; G06F 17/5009; G06F 17/5018; G06F 17/5072; G06F 17/5081

USPC .......... 716/52, 55, 118, 119, 122, 139; 703/1, 703/2, 14, 27, 28; 715/762, 243–250, 52, 715/55, 118, 119, 122, 139
See application file for complete search history.

(56) References Cited

U.S. PATENT DOCUMENTS 5,452,238 A * 9/1995 Kramer et al. ................. 703/1
5,617,510 A * 4/1997 Keyrouz et al. ............... 706/45
(Continued)

OTHER PUBLICATIONS

Dechter, et al., "Backjump-based Backtracking for Constraint Satisfaction Problems," Dec. 13, 2001.*
(Continued)

*Primary Examiner* — Eric J Bycer
(74) *Attorney, Agent, or Firm* — Kevin Sullivan; Kate Drakos; Micky Minhas (57) ABSTRACT

User interface layout is defined using constraints on the position and size of visual elements. Constraints may be explicit and/or implicit. Interactive design code helps designers create constraints without conflict or redundancy. The design code determines whether a proposed layout constraint is incompatible with established constraints, receives a designer's selection of an incompatible constraint, and displays user interface elements in previews of alternate layouts having different constraints. A designer can interactively explore possible resolutions of constraint incompatibilities as soon as the constraints are detectable. The design code animates a transition between possible layouts, highlights the incompatible constraints, and hides the compatible constraints. A subset of constraints may be shown, such as only the recently added constraints and closely related constraints.

20 Claims, 5 Drawing Sheets

(56) References Cited

U.S. PATENT DOCUMENTS

| | | | |
|---|---|---|---|
| 5,640,498 A | | 6/1997 | Chew |
| 5,809,492 A | * | 9/1998 | Murray et al. .................. 706/45 |
| 5,842,192 A | * | 11/1998 | Garcia et al. .................... 706/45 |
| 6,047,233 A | | 4/2000 | Salvatore, Jr. |
| 6,189,132 B1 | * | 2/2001 | Heng et al. ..................... 716/122 |
| 6,449,761 B1 | * | 9/2002 | Greidinger et al. ........... 716/122 |
| 7,062,502 B1 | | 6/2006 | Kesler |
| 7,146,573 B2 | | 12/2006 | Brown et al. |
| 7,418,683 B1 | * | 8/2008 | Sonnard et al. ............... 716/122 |
| 7,478,341 B2 | | 1/2009 | Dove |
| 7,593,911 B1 | * | 9/2009 | Farah .............................. 706/47 |
| 2004/0030786 A1 | * | 2/2004 | Zehavi .......................... 709/229 |
| 2004/0145593 A1 | * | 7/2004 | Berkner et al. ............... 345/619 |
| 2004/0205472 A1 | * | 10/2004 | Purvis ........................... 715/500 |
| 2004/0215441 A1 | * | 10/2004 | Orofino et al. ................. 703/22 |
| 2005/0010922 A1 | * | 1/2005 | Czajkowski et al. ......... 718/102 |
| 2005/0094205 A1 | * | 5/2005 | Lo et al. ........................ 358/1.18 |
| 2005/0132283 A1 | * | 6/2005 | Diwan et al. .................. 715/517 |
| 2005/0172224 A1 | * | 8/2005 | Kobashi et al. ............... 715/517 |
| 2005/0172261 A1 | | 8/2005 | Yuknewicz et al. |
| 2005/0289561 A1 | * | 12/2005 | Torres et al. .................. 719/328 |
| 2006/0010439 A1 | * | 1/2006 | Majidian .......................... 718/1 |
| 2006/0200759 A1 | * | 9/2006 | Agrawala et al. ............. 715/517 |
| 2006/0218489 A1 | * | 9/2006 | Ovetchkine et al. .......... 715/517 |
| 2006/0238652 A1 | | 10/2006 | Parker et al. |
| 2007/0002377 A1 | * | 1/2007 | Tokunaga ..................... 358/1.18 |
| 2007/0010901 A1 | * | 1/2007 | Fukui .............................. 700/34 |
| 2007/0208996 A1 | * | 9/2007 | Berkner et al. ............... 715/521 |
| 2007/0266307 A1 | * | 11/2007 | Panditharadhya et al. ... 715/502 |
| 2008/0120534 A1 | * | 5/2008 | Moore ........................... 715/243 |
| 2008/0301619 A1 | * | 12/2008 | Ogami et al. ................... 716/17 |
| 2009/0037844 A1 | | 2/2009 | Kim et al. |
| 2009/0077505 A1 | * | 3/2009 | Arsintescu ........................ 716/1 |
| 2009/0228291 A1 | * | 9/2009 | Rothberg et al. ................ 705/1 |
| 2009/0254814 A1 | * | 10/2009 | Lai et al. ....................... 715/244 |
| 2009/0276303 A1 | * | 11/2009 | Singhal ...................... 705/14.11 |
| 2009/0276383 A1 | * | 11/2009 | Salahshour et al. ............ 706/12 |
| 2009/0327925 A1 | | 12/2009 | Smet |
| 2010/0115460 A1 | | 5/2010 | Pegg |
| 2010/0275152 A1 | * | 10/2010 | Atkins et al. .................. 715/788 |
| 2010/0306681 A1 | * | 12/2010 | Loberg et al. ................. 715/764 |
| 2012/0047479 A1 | * | 2/2012 | Paris et al. .................... 716/112 |

OTHER PUBLICATIONS

"Assembly Constraint Errors and Recovery," AUTODESK WikiHelp, dated Mar. 25, 2010, and retrieved from http://wikihelp.autodesk.com/index.php?title=Inventor/enu/2011/Help/User%027s_Guide/104Assemblies/1374Buildassemblies/1407Constraints/1411Assemblyconstrainte&action=diff&revision=6&diff=1 on May 8, 2013, 12 pages.*
Kveton et al., "Hueristic Refinements of Approximate Linear Programming for Factored Continuous-State Markov Decision Processes," American Association for Artificial Intelligence, 2004, 9 pages.*
Borning et al., "Solving Linear Arithmetic Constraints for User Interface Applications," The 10th Annual ACM Symposium on User Interface Software and Technology, 1997, pp. 87-96.*
Burns et al., "Detection of Overconstraints in IC Layout Compaction," IBM Technical Disclosure Bulletin, vol. 35 No. 4B, Sep. 1, 1992, pp. 466-469.*
Dollar, Hillary, "Iterative Linear Algebra for Constrained Optimization," University of Oxford, 2005, 235 pages.*
Freeman-Benson et al., "An Incremental Constraint Solver," Communications of the ACM, vol. 33, No. 1, Jan. 1990, pp. 54-62.*
Gosling, James, "Algebraic Constraints," Carnegie-Mellon University, Department of Computer Science, May 1983, 99 pages.*
Hower et al., "A Bibliographic Survey of Constraint-Based Approaches to CAD, Graphics, Layout, Visualization, and Related Topics," Knowledge-Based Systems 9, 1996, pp. 449-464.*
Hosobe, Hiroshi, "A Modular Geometric Constraint Solver for User Interface Applications," The 14th Annual ACM Symposium on User Interface Software and Technology, 2001, pp. 91-100.*
Ouis et al., "COINS: A Constraint-Based Interactive Solving System," Proceedings of the 12th International Workshop on Logic Programming Environments, Jul. 2002, pp. 31-45.*
Latham et al., "Connectivity Analysis: A Tool for Processing Geometric Constraints," Computer-Aided Design, vol. 28 No. 11, 1996, pp. 917-928.*
Lutteroth et al., "End-User GUI Customization," Proceedings of the 9th Annual ACM Special Interest Group on Computer Human Interface—New Zealand Conference on Human-Computer Interaction, Jul. 2, 2008, pp. 1-8.*
Lutteroth et al., "User Interface Layout with Ordinal and Linear Constraints," Australian Computer Society, 2006, 8 pages.*
Martinez et al., "A Constraint Solver to Define Correctly Dimensioned and Overdimensioned Parts," Computer-Aided Design, vol. 37, 2005, pp. 1353-1369.*
Sabes, Philip, "Linear Algebraic Equations, SVD, and the Pseudo-Inverse," Oct. 2001, pp. 1-8.*
Scoditti et al., "A New Layout Method for Graphical User Interfaces," IEEE, 2009, pp. 642-647.*
Sannella et al., "Multi-way Versus One-way Constraints in User Interfaces: Experience with the DeltaBlue Algorithm," Software-Practice and Experience, vol. 23(5), May 1993, pp. 529-566.*
Grundy, et al., "Developing Adaptable User Interfaces for Component-based Systems", Retrieved at <<http://citeseerx.ist.psu.edu/viewdoc/download?doi=10.1.1.81.1226&rep=rep1&type=pdf>>,2000, pp. 13.
"Creating UI Automation Client Applications", Retrieved at <<http://www.code-magazine.com/articleprint.aspx?quickid=0810122&printmode=true>>, Retrieved date: Sep. 24, 2010, pp. 9.
"UW Constraint-Based Systems", Retrieved at <<http://www.cs.washington.edu/research/constraints/>>, retrieved Oct. 1, 2010, pp. 2.
Hoffmann, et al., "A Brief on Constraint Solving", Retrieved at <<http://www.cs.purdue.edu/homes/cmh/distribution/papers/Constraints/ThailandFull.pdf>>, Apr. 7, 2005, pp. 38.
"Microsoft Solver Foundation", Retrieved at << http://code.msdn.microsoft.com/solvefoundation >>, Jul. 20, 2008, pp. 2.
"Technical Comparison: Autodesk Inventor 5.3 to Dassault's SolidWorks 2001 Plus", Retrieved at <<http://cad.amsystems.com/products/docs/inventorseries_competitive.pdf>>, 2002. pp. 21.
Hoffmann, "Geometric Constraint Solving", Retrieved at <<http://www.cs.purdue.edu/homes/cmh/distribution/PubsCons.html>>, retrieved Oct. 1, 2010, pp. 2.
"Download Mapack for .NET 1.0 Free", Retrieved at <<http://www.softpedia.com/get/Programming/Components-Libraries/Mapack-for-NET.shtml>>, retrieved Oct. 1, 2010, pp. 2.
Badros, et. al., "The Cassowary Linear Arithmetic Constraint Solving Algorithm: Interface and Implementation", Retrieved at <<http://www.cs.washington.edu/research/constraints/cassowary/cassowary-tr.pdf>>, Jun. 29, 1998, pp. 31.
"Layout System", Retrieved at <<http://msdn.microsoft.com/en-us/library/ms5745058.aspx>>, retrieved Nov. 12, 2010.
Kothari, "Specialized Layout Panels for Silverlight", Retrieved at <<http://www.nikhilk.net/Silverlight-Layout-Panels-1.aspx>>, Mar. 6, 2009, pp. 7.

* cited by examiner

DISPLAY AND RESOLUTION OF INCOMPATIBLE LAYOUT CONSTRAINTS

BACKGROUND

Graphic design disciplines utilize visual communication and presentation methods. A graphic designer may use typography, visual arts, data visualization, and page layout techniques to convey information, for example. Symbols, images, interactive controls, and/or words can be combined to create a pleasing and efficient visual presentation of ideas and opportunities, thus providing a favorable user experience.

Composition of visual components is an important aspect of graphic design. The number of components to choose from, and the ways in which they can be combined, are each extremely large. But skilled composition and other design efforts can enhance readability, aid comprehension, characterize features persuasively, assist navigation through organized bodies of information, and facilitate recall, for example.

Graphic design efforts are evident in a wide variety of items. In particular, software user interface design involves graphic design. In computer applications, whether standalone or networked, user interface elements can convey information in words and images, by integrating visual communication skills with human-computer interaction techniques. The design of user interfaces includes selecting and arranging interface elements in static and/or dynamic visual layouts, which will be displayed to users of the application.

SUMMARY

The layout of an application's user interface can be defined at design time using a set of constraints on the position and size of the elements in the application, but it is difficult to create a set of constraints that is free of conflict and redundancy. Some embodiments described herein facilitate user interface design, by automatically and promptly determining at design time that a proposed constraint on user interface element(s) is incompatible with a set of established constraint(s), and supporting incompatibility resolution, rather than delaying constraint detection and resolution. Constraints may be proposed by a designer on characteristics such as element width, element height, element alignment, element centering, element margins, and/or element padding, for example.

A designer can interactively and intuitively explore possible resolutions of constraint incompatibilities as soon as the constraints are detectable, by selecting an incompatible constraint, seeing an alternate layout in which the selected incompatible constraint is removed and the proposed constraint is added, selecting another incompatible constraint to see another alternate layout, and so on. Some embodiments animate a display to show a transition from a pre-resolution layout before the selected constraint is removed to a post-resolution layout after the selected constraint is removed and the proposed constraint is added.

In some situations, a proposed constraint is incompatible in that it is redundant, and the embodiment shows a visual identification of established constraints that fulfill the same role as the proposed constraint. In some, the proposed constraint is incompatible in that it is conflicting, and the embodiment shows a visual identification of established constraints that conflict with the proposed constraint. In some cases, an embodiment visually highlights some or all of the incompatible constraints, and in some cases compatible constraints are hidden from view. A heuristic constraint filter may be used to show only a subset of valid replacement constraints, e.g., recently added valid replacement constraints and/or closely related valid replacement constraints.

In some embodiments a user interface designer adds user interface elements to a layout, establishes layout constraint(s) on the user interface elements, and at some point proposes another layout constraint which is incompatible with the established constraint(s). The incompatibility is promptly detected and displayed to the designer. Upon seeing incompatible constraints highlighted in the layout, the designer can select one of the incompatible constraints, and view an automatically generated alternate layout scenario in which the selected constraint is removed and the proposed constraint is added. Thus informed, the designer may confirm replacement of the incompatible constraint(s) by the proposed constraint, or confirm retention of the incompatible constraint(s) and rejection of the proposed constraint, for example. Constraint selection can be done by placing a cursor over an incompatible constraint, using a mouse, trackball, pen, or touchscreen, for example. In some situations, the designer views an animation of a visual representation of all the user interface elements whose layout characteristic(s) would be changed by removal of the selected constraint and/or by addition of the proposed constraint.

Some embodiments provide a logical processor, and a memory in operable communication with the logical processor. User interface elements reside in the memory, as do constraints on the user interface elements. An interactive design code residing in the memory has data and instructions configured to cause processor(s) to determine whether a proposed constraint on user interface element(s) is incompatible with a set of established constraint(s), to receive a designer's selection of an incompatible constraint, and to display the user interface element(s) to the designer in at least one alternate layout in which the selected constraint is removed and the proposed constraint is added.

The design code may include one or more solver components, such as a linear algebraic constraint solver, a linear optimization constraint solver, a nonlinear constraint solver, a logic-based constraint solver, a graph-based constraint solver, or another constraint solver. The constraints may include explicit constraints and/or implicit constraints, and in some cases layout is completely determined by the constraints. A heuristic constraint filter may be present, to limit the constraints that are initially presented to a designer; additional constraints may be seen on demand.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

The user interface (UI) layout of an application can be defined using a set of constraints on the position and size of the elements in the application, such as "the width of element A is twice the width of element B". However, it is sometimes a very challenging task to create a set of layout constraints without conflict or redundancy. In many nontrivial UI layouts, some constraints are interdependent. Recognizing these dependencies and the consequences of adding a new constraint can be time consuming, and often requires a depth of constraint solver understanding that many UI designers lack.

Furthermore, when a conflict arises, discovering how to resolve it also requires expert knowledge and/or lengthy trial and error. There are often multiple ways to resolve a conflict. UI designers would appreciate a convenient way to know at design time what resolutions are available and to have the opportunity to select a resolution whose effect on the entire layout satisfies the designer.

Some embodiments described herein provide tools and techniques for resolving a conflict in a constraint based layout. Some embodiments show a UI designer only the constraints that are relevant to a conflict, allow the designer to preview the results of different resolutions, and let the designer resolve the conflict by selecting which constraint(s) to replace. Such approaches allow UI layout designers to avoid conflicts up front, which in turn allows embodiments to employ less complex constraint solvers than would be needed if constraint detection and resolution was postponed rather than being interactively available during layout design.

Some embodiments provide designers with the ability to preview the effect a constraint conflict resolution will have on an entire layout. Some display the difference between layouts using animation. Some use a dialog-free approach for displaying and resolving a conflict, by highlighting a conflicting constraint and replacing it with the new constraint when selected.

In some embodiments, when a designer attempts to add a redundant or conflicting constraint to a layout, the set of constraints that either fulfill the same role or conflict with the new constraint are highlighted. Uninvolved constraints are hidden. When the designer's cursor is over a particular conflicting constraint, the layout that would result from replacing that constraint with the new constraint is previewed.

The preview may animate a representation (such as an outline or semitransparent copy) of all the elements whose size or position will change under the new set of constraints. In the animation, a representation of a given element begins at the current location of the element and moves and/or resizes to its new position. If the user clicks on the conflicting constraint, it is replaced with the new constraint and the elements move to the previewed position. However, if the cursor is moved off the conflicting constraint, the preview disappears, enabling the user to move the cursor over other conflicting constraints in order to preview other resolutions. If no conflicting constraint is selected to be replaced, the new constraint is not added to the layout.

Some embodiments described herein may be viewed in a broader context. For instance, concepts such as inconsistency, redundancy, layout, constraints, selection, resolution, and animation may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and processes involving inconsistency, redundancy, layout, constraints, selection, resolution, and/or animation are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Application" is used broadly herein, to include stand-alone application programs, web- or other network-based programs, utilities, diagnostics, kernels, libraries, and other code which includes or utilizes user interface layout(s).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Design time" (or "designtime") refers to time period(s) when a user interface designer is creating an application's user interface. By contrast, "runtime" refers to when a user is interacting with the application after the designer has published it.

Throughout this document, use of the optional plural "(s)" means that one or more of the indicated feature is present. For example, "element(s)" means "one or more elements" or equivalently "at least one element".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "receiving", "sending", "displaying", or "viewing" and a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
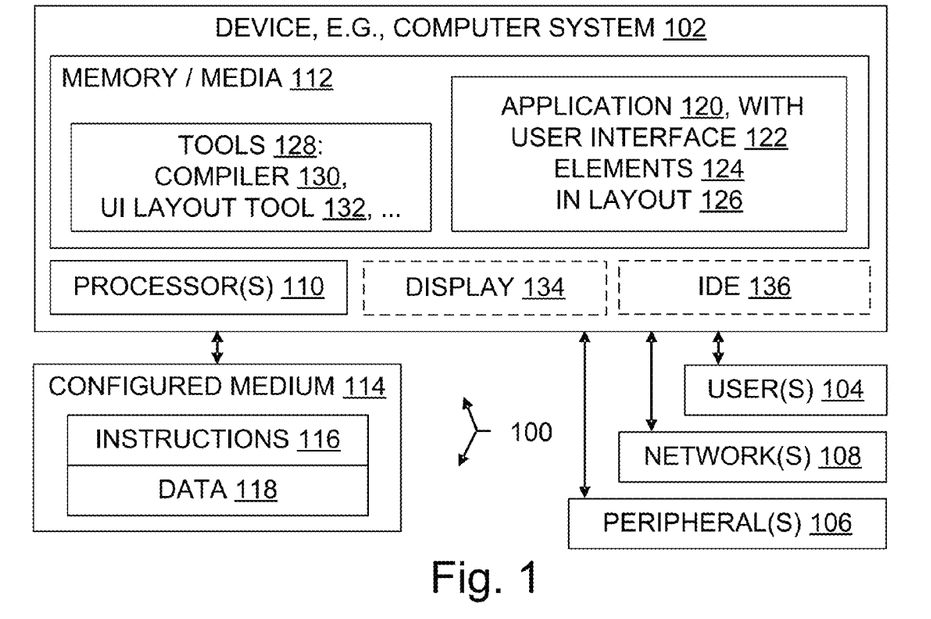
FIG. 1 is a block diagram illustrating a computer system having at least one processor, at least one memory, at least one tool for layout of user interface elements, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, UI designers, and end-users are examples of users 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, and/or optical media (as opposed to merely a signal). In particular, a configured storage medium 114 such as a CD, DVD, memory stick, or other removable non-volatile memory medium may become functionally part of the computer system when inserted or otherwise installed, making its content accessible for use by processor 110. The removable configured storage medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by layout design as discussed herein, e.g., by constraining, highlighting, hiding, binding, deployment, execution, modification, display, creation, loading, and/or other operations.

An application 120 with a user interface 122 having visual elements 124 arranged in a layout 126, software development tools 128 such as compilers 130 and user interface layout tools 132, other software, and other items shown in the Figures and/or discussed in the text may reside partially or entirely within one or more media 112, thereby configuring those media. In particular, an operating environment may include user interface layout tools such as the Microsoft® Expression Blend® tool and/or other tools 132 for creating graphical interfaces for web and/or desktop applications (marks of Microsoft Corporation). A given operating environment 100 may include an Integrated Development Environment (IDE) 136 which provides a developer with a set of coordinated software development tools 128. An operating environment generally also includes a display 134 and other hardware, such as buses, power supplies, accelerators, and the media 112 and processor(s) 110, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
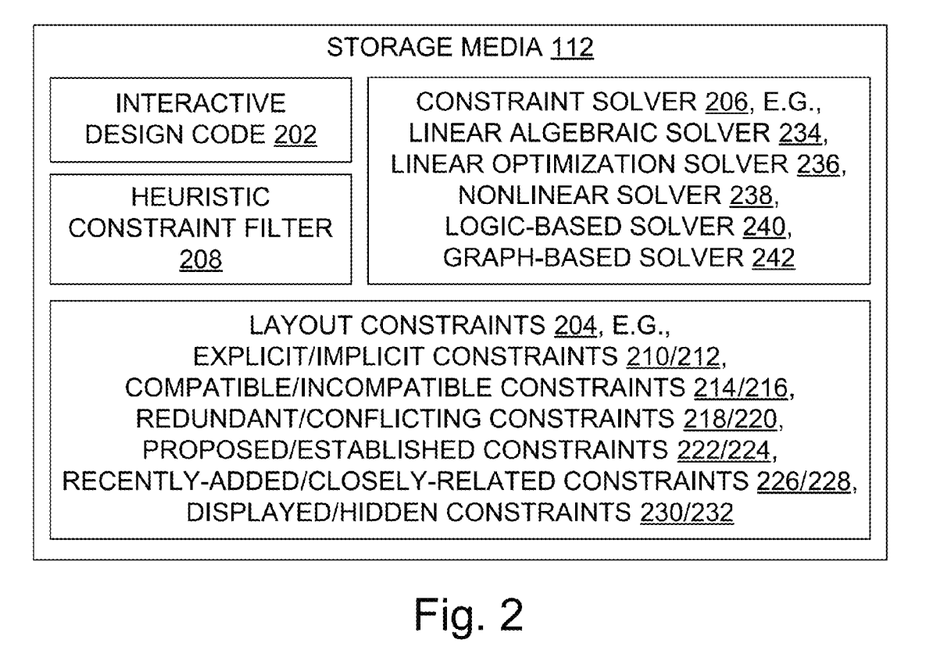
FIG. 2 is a block diagram illustrating design-time layout constraint incompatibility detection and resolution features in an example architecture.

FIG. 2 illustrates an architecture which is suitable for use with some embodiments. Interactive design code 202 alerts designers to potential conflicts or other incompatibilities among layout constraints 204, allows the designer to preview possible layouts 126 in which the incompatibilities are resolved, and accepts and implements the designer's selection of a resolution to the incompatibilities. A constraint solver 206 is invoked by the design code 202 to identify incompatibilities. A heuristic constraint filter 208 helps organize possible resolutions by showing the designer specified subsets of incompatible constraints.

In the illustrated embodiment, the constraints 204 may take various forms. Explicit constraints 210 are directly specified by the designer, whereas implicit constraints 212 are automatically determined necessary results of other (explicit and/or implicit) constraints. Compatible constraints 214 are constraints which can efficiently coexist in the same layout 126. Incompatible constraints 216 are either redundant constraints 218 (redundancy in this case is inefficient), or conflicting constraints 220 which cannot coexist because they impose conflicting requirements such as locating a given element's edge simultaneously at two different distances from a parallel edge of another element, for example.

Proposed constraints 222 are constraints proposed by a designer but not yet committed to the layout, whereas established constraints 224 are part of the layout. Recently-added constraints 226 are constraints which became established constraints 224 within a previously specified time period or other chronological measure. For example, recently-added constraints 226 may be specified in a given embodiment as the ten most recently established constraints, or as all constraints established in the last five minutes, or all constraints established since the last time the layout was saved to disk. Closely-related constraints 228 are established constraints 224 which are closely related to a given constraint, in some specified manner. For example, all constraints pertaining to any element that the given constraint constrains may be considered closely-related constraints.

Displayed constraints 230 are constraints 204 which are visible to the designer on the display 134 at a given time. Displayed constraints may be highlighted, or may be visible but not highlighted. Hidden constraints 232 are constraints 204 which are not visible to the designer on the display 134 at a given time, although their presence might be inferred from what is shown on the display.

In the illustrated embodiment, the constraint solver 206 may take various forms. Several examples of constraint solvers are enumerated, namely, a linear algebraic solver 234, a linear optimization solver 236, a nonlinear solver 238, a logic-based solver 240, a graph-based solver 242, each of which employs the indicated familiar constraint solving technology. Some embodiments use a single constraint solving technology, while others use multiple constraint solving technologies.

Figure 3:
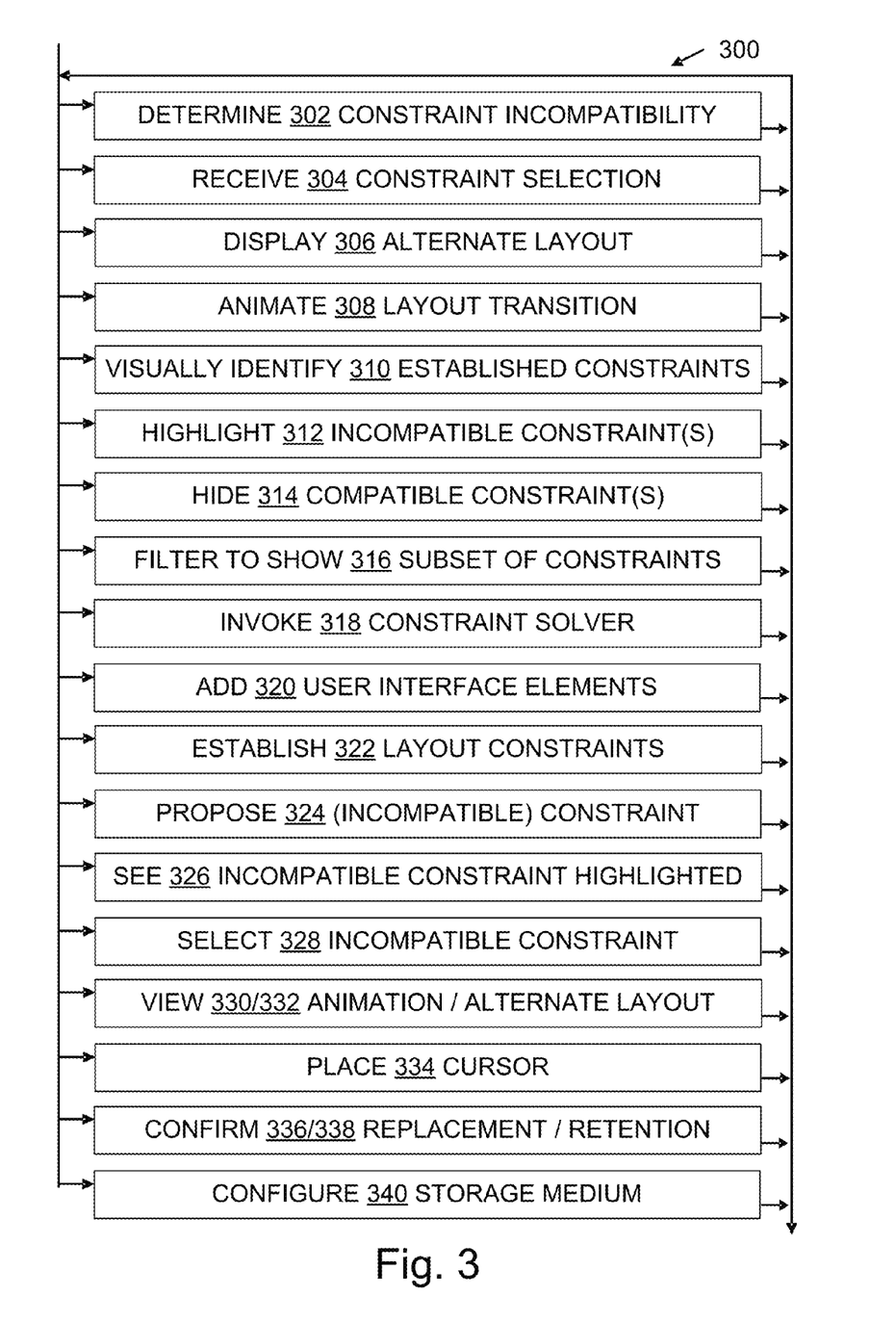
FIG. 3 is a flow chart illustrating steps of some process and configured storage medium embodiments.

With reference to FIGS. 1 through 3, some embodiments provide a computer system 102 with a logical processor 110 and a memory medium 112 in operable communication with the logical processor, configured by circuitry, firmware, and/or software to transform a layout by determining and resolving incompatible constraints as described herein. User interface elements 124 and constraints 204 on the user interface elements reside in the memory 112. An interactive design code 202 residing in the memory has data and instructions configured to cause processor(s) 110 to determine whether a proposed constraint 222 on user interface element(s) is incompatible with a set of established constraint(s) 224, to receive a designer's selection of an incompatible constraint 216, and to display the user interface element(s) to the designer in at least one alternate layout 126 scenario in which the selected constraint is removed and the proposed constraint is added. In some cases, the constraints involved include both explicit constraints 210 and implicit constraints 212; in other cases, only explicit constraints are involved in the alternate layout preview. In some embodiments, the design code includes a heuristic constraint filter 208. Layout is not necessarily completely determined by the constraints.

In some embodiments, the design code 202 includes an algebraic constraint solver 234, as opposed to a logic-based constraint solver or graph-based constraint solver, for example. In others, the design code includes one or more of the following: a linear algebraic constraint solver 234, a linear optimization constraint solver 236, a nonlinear constraint solver 238, a logic-based constraint solver 240, a graph-based constraint solver 242.

It will be appreciated that in general the presence of conflicting or redundant constraints implicates a more capable and complicated (and thus more resource intensive) constraint solver, to deal with the conflicts and redundancies. In some approaches, a relatively complicated solver is part of the runtime, which adversely affects the user's experience. However, some embodiments provided herein deal with conflicting constraints using designtime code, thus allowing the runtime to have a simple, fast solver because all conflicts are removed in the designtime before the application is made available to end users. Such embodiments can provide helpful designtime feedback to the person creating the application, which allows them to make beneficial decisions about layout conflicts. Designers can have a positive designtime experience despite the complicated work being done in the code 202.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, user interface elements 124 may be laid out on multiple devices/systems 102 in a networked cloud, solvers 206 may run on yet other devices within the cloud, and the alternate layouts may configure displays on yet other cloud device(s)/system(s) 102 before being presented as snapshots to the designer.

Processes

FIG. 3 illustrates some process embodiments in a flowchart 300. Processes shown in the Figures may be performed in some embodiments in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an incompatibility determining step 302, an embodiment determines whether a proposed constraint and a set of established constraints are incompatible, that is, whether they collectively contain redundancies or conflicting requirements. Step 302 may be accomplished using familiar constraint solver 206 technology and/or or other mechanism(s), for example.

During a constraint selection receiving step 304, an embodiment receives a designer's selection of a constraint 204. Constraints may be selected for a temporary activity such as previewing an alternate layout, or for a more lasting result such as changing the set of established constraints. Step 304 may be accomplished using familiar selection mechanisms such as mousing over a visual item, touch screens, pens, track balls, and so on.

During an alternate layout displaying step 306, an embodiment displays an alternate layout 126, namely, a layout in which the governing set of established constraints has been modified, at least temporarily. Step 306 may be accomplished using familiar mechanisms for displaying layouts, modified as discussed herein, e.g., as in connection with the examples shown in FIGS. 4-8 discussed later in this document.

During a layout transition animating step 308, an embodiment animates a transition between two layouts, e.g., by showing elements 124 in motion on a display, or by alternating between layouts in a "before/after" manner which illustrates the transition.

During a visual identifying step 310, an embodiment visually identifies established constraints, e.g., by using architectural markings, text, callouts, color differences, motion, and/or other visual identifiers in a layout display. In particular, and without limitation, any or all of the visual identifiers shown in FIGS. 4-8 may be employed in a given embodiment. Visually identified constraints are not hidden from the designer's view, but are not necessarily highlighted.

During a constraint highlighting step 312, an embodiment visually highlights a displayed constraint, e.g., by using color differences, motion, callouts, and/or other familiar visual highlighting mechanisms in a layout display.

During a constraint hiding step 314, an embodiment hides a constraint from a designer's view, e.g., by removing the constraint's step 310 identifier(s) from a layout display. Hiding a constraint does not itself remove the constraint from membership in a set of constraints in memory. Thus, hiding changes which constraint(s) are visible, not which constraint(s) are imposed on UI elements.

During a filtering step 316, or a corresponding filter result showing step 316, an embodiment shows a filtered subset of constraints. Filtering done by a heuristic constraint filter 208, for example, may exclude from a designer's view constraints which are not closely related, not recently added, or which otherwise fail to meet specified filtering criteria.

During a solver invoking step 318, an embodiment invokes a constraint solver 206. Familiar invocation mechanisms, such as stacks, parameters, procedure calls, remote procedure calls, message passing, and so on may be used.

During an element adding step 320, a designer (or an embodiment acting on the designer's behalf) adds an element 124 to a layout 126. Toolbars, menus, drag-and-drop, duplication, and other familiar mechanisms used generally in adding visual design elements can be employed.

During a constraint establishing step 322, a designer (or an embodiment acting on the designer's behalf) establishes a constraint 204 on an element 124 in a layout 126. Dialog boxes, context-sensitive menus, defaults, and other familiar mechanisms used generally in specifying desired constraints on visual design elements can be employed, as may familiar data structures representing constraints.

During a constraint proposing step 324, a designer (or an embodiment acting on the designer's behalf) proposes a constraint 204 on an element 124 in a layout 126. Proposing a constraint may be considered in some ways a part of establishing 322 the constraint, and mechanisms used in step 322 to specify and represent constraints may also be used in step 324. However, proposing 324 constraints may also be considered separately, particularly in case the proposed constraint is incompatible with constraints that have already been established.

During an incompatible constraint seeing step 326, a designer sees one or more incompatible constraints highlighted 312 in a display. Alternately, the incompatible constraints may be the only ones shown 316.

During a selecting step 328, a designer selects an incompatible constraint. Selecting step 328 corresponds generally with selection receiving step 304, except for the designer point-of-view in step 328 versus the design code 202 point-of-view in step 304.

During an animation viewing step 330, a designer views an animation between layouts 126. Animation viewing step 330 corresponds generally with animating step 308, except for the designer point-of-view in step 330 versus the design code 202 point-of-view in step 308.

During an alternate layout viewing step 332, a designer views an alternate layout 126 in response to selection of an incompatible constraint 216. Alternate layout viewing step 332 corresponds generally with alternate layout displaying step 306, except for the designer point-of-view in step 332 versus the design code 202 point-of-view in step 306.

During a cursor placing step 334, a designer (or an embodiment acting on the designer's behalf) places a cursor on a visible constraint 204 in a layout. Familiar cursor placement mechanisms (mouse, touch screen, etc.) may be used.

During a replacement confirming step 336, a designer confirms replacement of one or more constraints by one or more other constraints. Step 336 may use an enter key, a double-click, and/or other familiar UI mechanisms indicating a user command or selection.

During a retention confirming step 338, a designer confirms retention of one or more constraints. Step 338 may use the same UI mechanisms as step 336, and the two steps will generally be presented to a designer as alternatives to one another.

During a memory configuring step 340, a memory medium 112 is configured by an interactive design code, a layout transition animation, filtered subsets of layout constraints, or otherwise in connection with design time layout constraint incompatibility detection and resolution as discussed herein.

The foregoing steps and their interrelationships are discussed in greater detail below, in connection with various embodiments.

Some embodiments provide a process of facilitating user interface design for an application. The process includes automatically determining 302 during a design time phase (namely, before a designer publishes the application) that a proposed constraint 222 on user interface element(s) 124 is incompatible with a set of established constraint(s) 224, receiving 304 during the design time phase the designer's selection of an incompatible constraint 216, and displaying 306 during the design time phase the user interface element(s) to the designer in at least one alternate layout 126 scenario in which the selected constraint is removed and the proposed constraint is added.

Some embodiments include automatically animating 308 a display to show a transition from a pre-resolution layout before the selected constraint is removed to a post-resolution layout after the selected constraint is removed and the proposed constraint is added.

In some cases, the proposed constraint is incompatible in that it is redundant, and the process shows 316 a visual identification 310 of established constraints 224 that fulfill the same role as the proposed constraint. In some cases, the proposed constraint is incompatible in that it is conflicting, and the process shows a visual identification of established constraints that conflict with the proposed constraint. In some cases, the process visually highlights 312 at least one of the incompatible constraints. In some, the process hides 314 compatible constraints from view.

A heuristic filter may be applied, thereby showing 316 only a subset of valid replacement constraints. For example, in some embodiments the process may initially show only recently added valid replacement constraints, or initially show only closely related valid replacement constraints. The process can then show more constraints if expressly commanded to do so by the designer. The established constraint(s) 224 on user interface elements may include constraints on at least one of the following: element width, element height, element alignment, element centering, element margins, element padding.

Some embodiments provide a process of user interface design, the process including steps performed at design time, namely, adding 320 user interface elements to a layout, establishing 322 layout constraint(s) on the user interface elements, proposing 324 another layout constraint which is incompatible with the established constraint(s), and seeing 326 the incompatible constraints highlighted in the layout. Upon selecting 328 one of the incompatible constraints, e.g., by placing a cursor over that incompatible constraint by using a mouse, trackball, pen, or touchscreen, one views 332 in response to the selection an alternate layout scenario in which the selected constraint is removed and the proposed constraint is added.

In some cases, the process includes viewing 330 an animation of a visual representation of all the user interface elements whose layout characteristic(s) (size, position, color, fill pattern, border pattern, etc.) would be changed by removal of the selected constraint and/or by addition of the proposed constraint.

After viewing 330/332, the process includes either confirming 336 replacement of the incompatible constraint(s) by the proposed constraint, or confirming 338 retention of the incompatible constraint(s) and rejection of the proposed constraint.

Configured Media

Some embodiments include a configured computer-readable storage medium 112. Storage medium 112 may include disks (magnetic, optical, or otherwise), RAM, EEPROMS or other ROMs, and/or other configurable memory devices, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as interactive design code 202, alternate layouts 126, layout transition animations, and constraint filters 208, in the form of data 118 and instructions 116, read from a removable medium 114 and/or another source such as a network connection, to form a configured storage medium. The configured storage medium 112 is capable of causing a computer system to perform process steps for transforming layout data as disclosed herein. FIGS. 1 through 8 thus help illustrate configured storage media embodiments and process embodiments, as well as system and process embodiments. In particular, any of the process steps illustrated in FIG. 3, or otherwise taught herein, may be used to help configure a storage medium to form a configured storage medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Figure 4:
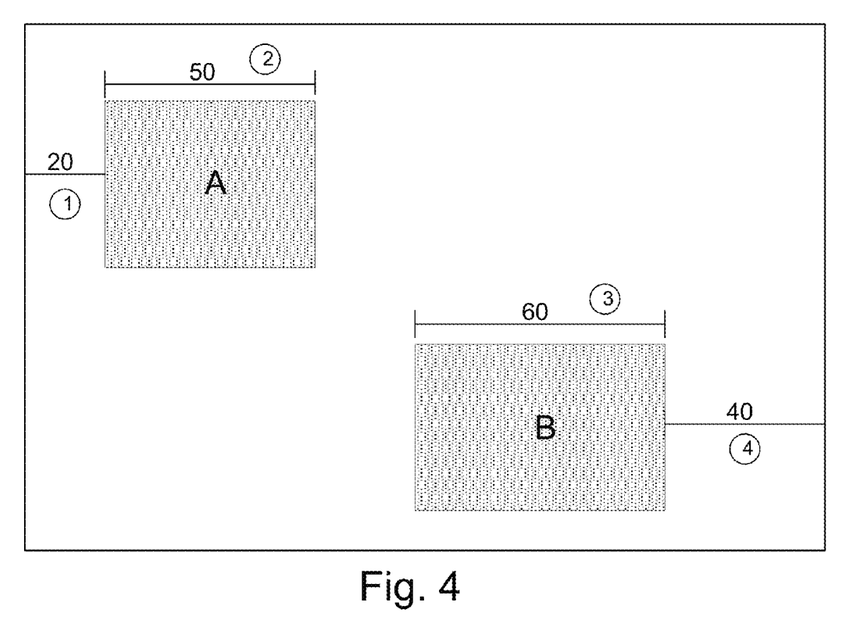
FIG. 4 is a screen snapshot diagram illustrating a layout with two elements, denoted A and B respectively, arranged inside a panel and subject to four constraints, which are denoted by circled numerals 1 through 4 and by architectural markings with respective numeric values shown.

As illustrated in FIG. 4, layout constraints can be represented as architectural dimensions. In this example, elements A and B are being arranged inside a panel subject to four constraints. Only the horizontal dimension is considered, but the same principles apply to the vertical dimension, or indeed to other layout contexts such as those using polar coordinates and/or non-rectangular borders.

Figure 5:
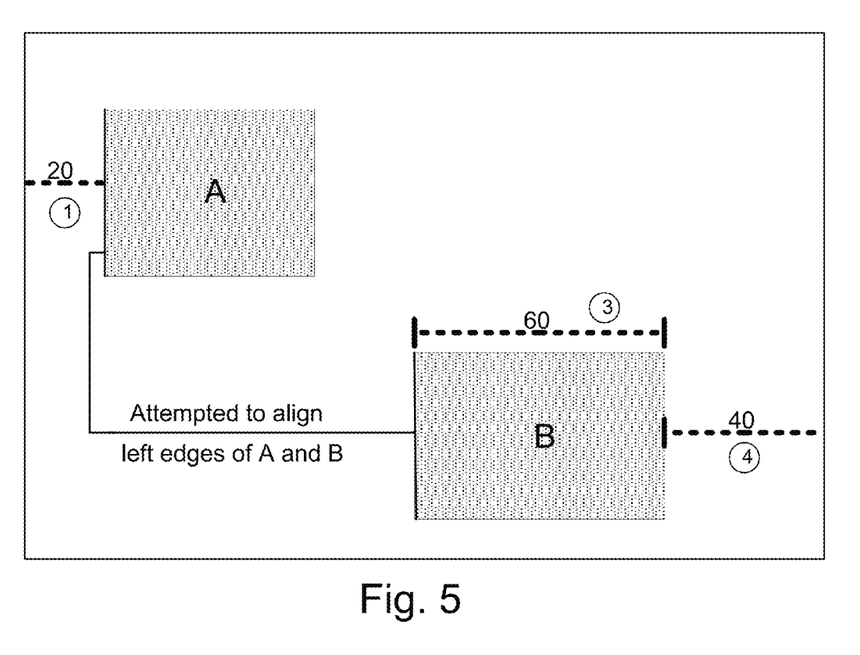
FIG. 5 is a subsequent snapshot of the screen diagram shown in FIG. 4, illustrating a conflict arising from a designer's attempt to align the left edges of elements A and B.

FIG. 5 illustrates an example of a conflict. In this figure, the designer has attempted to align the left edges of A and B; the text to that effect in the Figure is pedagogical and would not necessarily appear onscreen in an embodiment. Alignment of the left edges is not possible due to constraints 1, 3, and 4, so those constraints are highlighted. In an embodiment utilizing color displays, highlighting may be shown by a color change, e.g., by displaying highlighted items in red rather than some other (non-highlighted) color. In monochrome images of the present document's Figures, and in some embodiments, highlighting is shown by using a thick dashed line rather than a (non-highlighted) thinner solid line. Constraint 2 from FIG. 4 is hidden in this FIG. 5 example, since constraint 2 is not in conflict with the proposed new constraint.

Figure 6:
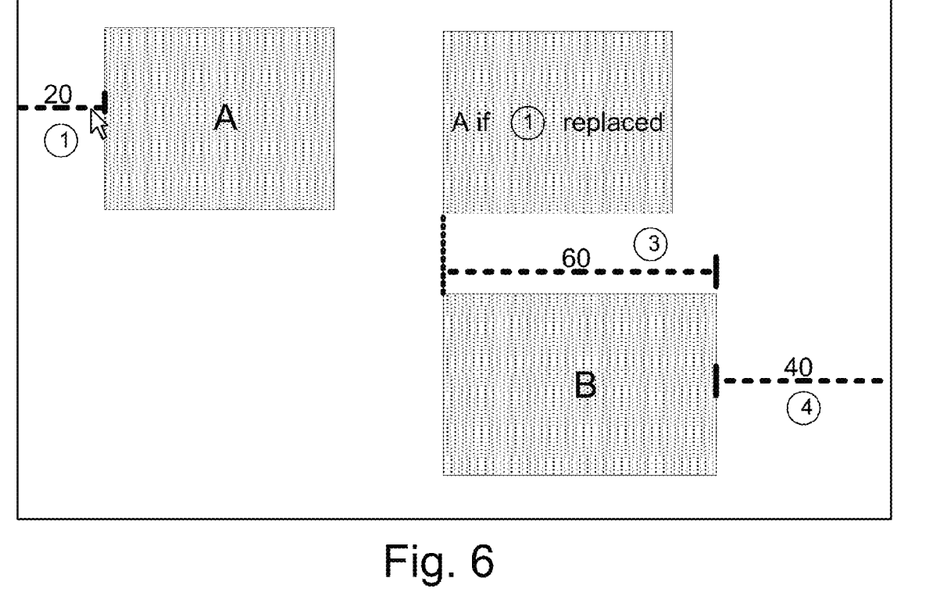
FIG. 6 is a subsequent snapshot of the screen diagram shown in FIG. 5, illustrating an alternate layout after the designer selects constraint 1.

As illustrated in FIG. 6, when the designer moves the mouse over constraint 1 (or selects that constraint in some other way), a preview of the result of replacing constraint 1 with the new alignment constraint is displayed. The conditional, "A if 1 replaced" rectangle animates 308 from A's current position to the position shown in FIG. 6, in some embodiments. The text "A if 1 replaced" is pedagogical and would not necessarily appear onscreen in an embodiment.

Figure 7:
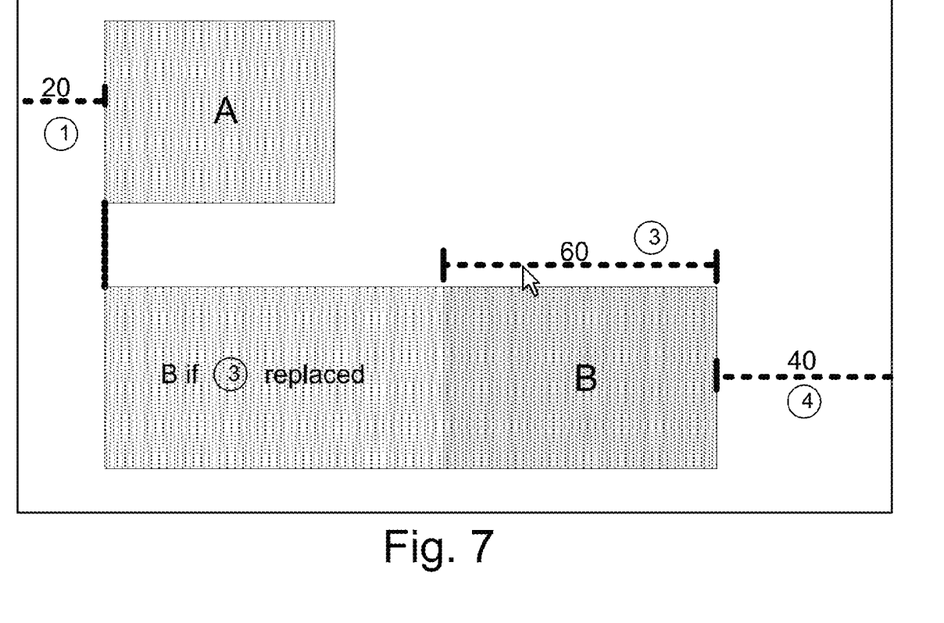
FIG. 7 is another subsequent snapshot of the screen diagram shown in FIG. 5, illustrating an alternate layout after the designer selects constraint 3.

FIG. 7 illustrates the result if constraint 3 is replaced. In this case, only the left edge of the "B replacement" rectangle is animated.

Figure 8:
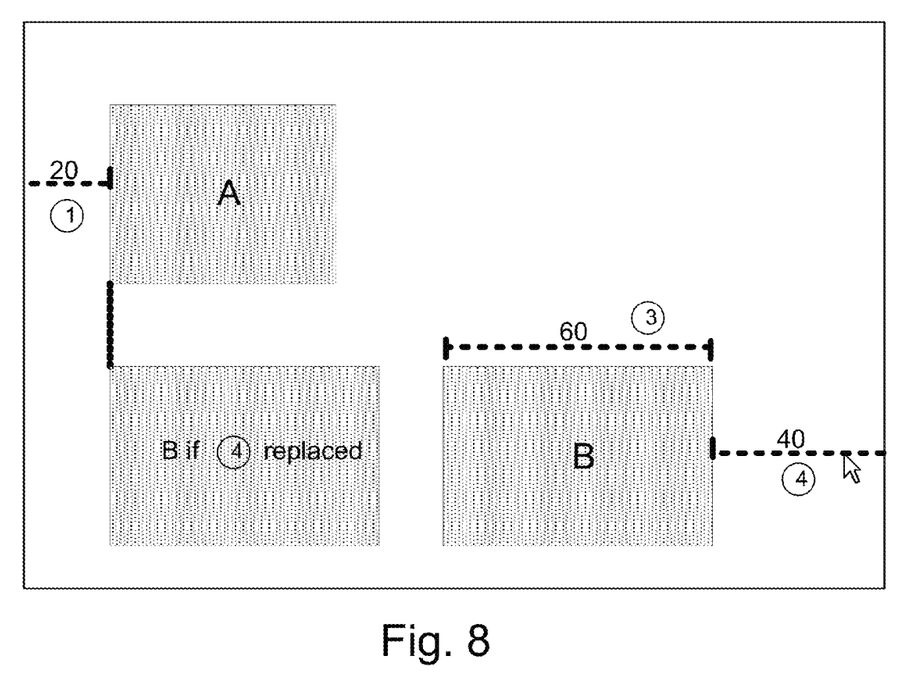
FIG. 8 is another subsequent snapshot of the screen diagram shown in FIG. 5, illustrating an alternate layout after the designer selects constraint 4.

FIG. 8 illustrates the result if constraint 4 is replaced.

It will be appreciated that in at least some situations, not all conflicting constraints are candidates for replacement by a new proposed constraint. It is possible to replace a conflicting constraint with the proposed constraint and still have an inconsistent system. Because of this the list of conflicting constraints can be filtered in some embodiments to show 316 only those constraints for which the proposed constraint is a valid replacement. Filtering can likely be accomplished using a brute force approach, at least for constraints related to one or two elements.

However, it is possible to add a constraint that requires the removal of more than one existing constraints. Consider this scenario: A has a right offset of 10, B has a right offset of 20 and C has a right offset of 30. The designer wishes to align the right edges of A and C to the right edge of B. This conflicts with the offsets on A and C, but removing either one of the two offset constraints is not enough to bring the system back to a consistent state. In this case, an embodiment conflict removal preview works as follows. The right offset on A and C are highlighted. The designer mouses over/otherwise indicates the right offset of A. A preview of A in alignment to B is shown. Selecting the conflict removes the right offset on A and it is aligned with B. However, the offset on C is still highlighted. Indicating the offset on C again shows a preview. Selecting the conflict on C removes the offset and the new alignment constraint is committed as an established constraint. At any point in the foregoing, the addition of the new constraint can be canceled, e.g., by hitting Escape or clicking somewhere besides a conflicting constraint.

In this example, a brute force approach to filtering the constraints would also work, but in more complicated cases, it may become prohibitively expensive to compute the complete list of valid replacements. In these cases a heuristic filter 208 can be used to show only a subset of the valid replacements. For example, the most recently added constraints could be favored, or those which are most closely related. For example suppose a chain of constraints links element C to some other element F and the proposed constraint also conflicts with a constraint on F. Because the proposed constraint does not directly reference F, an embodiment may be configured to not show that constraint.

More generally, one can describe relatedness using a graph where the elements are nodes and there is an edge linking the nodes if there is a constraint that references both elements. Nodes can be defined as "close" if they are connected by taking one or two steps along an edge, for example, or some other specified number of steps.

This approach is useful in highly interconnected systems where most elements are related to each other in some way or another. In such a case a new constraint can easily conflict with every existing constraint in the system. Showing 316 (at least initially) only the closely related constraints 228 can be helpful in such a case, in terms of both usability and performance.

It will also be appreciated that in some embodiments, the alternate layout preview display 306 (including animation 308) may not merely work as described for a single conflict case but may also be utilized multiple times when resolving a conflict requires the removal of multiple constraints (once for each removal). Also, the alternate layout preview could potentially involve more than simply showing a single element at its new position. As in the single constraint removal case, A or B may have relationships with other elements which will also be affected if A or B changes position.

Additional Implementation Notes

The following discussion is derived from documentation for a constraint based layout prototype. "ConstraintPanel" refers to a prototype program implemented by Microsoft Corporation. Aspects of the prototype program and/or its documentation are consistent with or otherwise illustrate aspects of the embodiments described herein. However, it will be understood that prototype documentation and/or implementation choices do not necessarily constrain the scope of such embodiments, and likewise that the prototype and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

The prototype documentation explores the design and implementation of an alternative layout mechanism based on constraints. The observations made here are made in retrospect and hence would not necessarily have been apparent to one of ordinary skill at the time a given embodiment was conceived.

Constraint based layout is an alternative layout approach. In this approach, the designer declares a set of relationships between elements. Some examples: "A and B have the same width and are top aligned." "The right edges of E, F, and G are the same." "The height of A is twice the width of B." Using constraints, the same ideas and gestures used in a mockup can be used to create a working application.

For example, constraints can allow the designer to talk about the centers of elements, to create proportional relationships between elements that are not in the same row or column, to create proportional relations between width and height, to distribute elements vertically or horizontally, and to enforce equal distance between elements.

Some decisions specific to a prototype relate to the constraint solver, a component that helps reconcile all the constraints in a system. According to Christopher Hoffmann, "Geometric constraint solving methods can be roughly classified as graph-based, logic-based, or algebraic. For 2D solvers, the graph-based approach has become dominant in CAD." While this approach has many advantages, Hoffman says "the disadvantage is that the graph analysis of a fully competent solver is rather complicated." On the hypothesis that layout would not require the power of a "fully-competent" graph-based solver, a prototype constraint solver used an algebraic approach.

Two other questions are "How is the constraint solver exposed to the user?" and "How do constraints integrate with the platform's layout system?" In the prototype both these questions are addressed using a custom Panel named "ConstraintPanel." Because it is a Panel, ConstraintPanel participates in the platform's layout system. It exposes a collection of constraints which reference the panel and its children. This approach is relatively straightforward and can be well integrated with the Microsoft® Expression Blend® platform. However, it makes constraints yet another special purpose panel, and embodiments are not limited to the prototype's platform.

Additional choices that shaped the prototype include the following. ConstraintPanel behaves like a Canvas until told otherwise. Everything is a constraint, meaning that the layout is completely determined by constraints, as opposed to relying on preexisting layout properties. The solver is linear. This means the variables that describe the layout can be added, subtracted, and multiplied by constant values, but functions like sine or square root are not allowed. The linear system is fully constrained. Constraints can either be implicit or explicit. Explicit constraints are created by the designer, implicit constraints are the default, "canvas-like" constraints used to make the system fully constrained.

The solver may be further explained by example. In the context of layout, a purpose of the prototype constraint solver is to take a collection of UIElements and a collection of Constraints and return a rectangle that satisfies the constraints for every UIElement. Each step in the process can be illustrated using a small example. For simplicity's sake, only constraints in the x dimension will be considered.

There are five steps in the prototype solver. First, variables are created for the edges of every element. Second, the constraints are resolved into mathematical vectors. Third, an adjacency matrix is built. Fourth, the mathematical system is solved, resulting in values for the edges of every element. Fifth, the elements are arranged using rectangles created from the solution. Each of these steps will be discussed in detail, subject to the caveats noted above regarding their relationship (if any) to claimed embodiments.

To begin, the XAML for an example is as follows:

```
<ConstraintPanel x:Name="P" Width="640" Height="480">
    <ConstraintPanel.Constraints>
        <BinaryConstraint Offset="70">
            <BinaryConstraint.LHS>
                <ConstraintTarget Property="Left" Name="S"/>
            </BinaryConstraint.LHS>
            <BinaryConstraint.RHS>
                <ConstraintTarget Property="Left" Name="P"/>
            </BinaryConstraint.RHS>
        </BinaryConstraint>
        <EqualityConstraint>
            <ConstraintTarget Property="Left" Name="S"/>
            <ConstraintTarget Property="Left" Name="T"/>
```
-continued
```
        </EqualityConstraint>
        <BinaryConstraint Offset="-300">
            <BinaryConstraint.LHS>
                <ConstraintTarget Property="Right" Name="T"/>
            </BinaryConstraint.LHS>
            <BinaryConstraint.RHS>
                <ConstraintTarget Property="Right" Name="P"/>
            </BinaryConstraint.RHS>
        </BinaryConstraint>
        <BinaryConstraint Scale="2">
            <BinaryConstraint.LHS>
                <ConstraintTarget Property="Width" Name="T"/>
            </BinaryConstraint.LHS>
            <BinaryConstraint.RHS>
                <ConstraintTarget Property="Width" Name="S"/>
            </BinaryConstraint.RHS>
        </BinaryConstraint>
    </ConstraintPanel.Constraints>
    <Rectangle x:Name="S" Fill="#FF4736D1"/>
    <Rectangle x:Name="T" Fill="#FFD16A36"/>
</ConstraintPanel>
```

The XAML syntax used here is verbose. The size of this XAML could be significantly reduced by implying constraints from layout properties like Width and Height and by using a mini-language. However, the above syntax is simple and sufficient for the prototype.

Prototype Step 1: Create the Variables

The first step in the prototype process being discussed is to create mathematical variables to represent the rectangles of the UIElements in the panel. There are four variables per child (left, top, right, and bottom) and an additional four for the panel itself, giving a total of 4n+4 variables where n is the number of children in the panel. Variables are stored internally as integers. The association between element and variables is maintained by a map from element name to a tuple of variables.

Since we are only considering horizontal constraints we have 2n+2 variables.

| Name | Left Index | Right Index | |
|------|-----------|-------------|---|
| P | 0 | 1 | |
| S | 2 | 3 | |
| T | 4 | 5 | => 6 × 1 matrix [Pl, Pr, Sl, Sr, Tl, Tr] |

For typographical convenience, "Pl" and "$P_l$" are used interchangeably herein, as are the other five subscripted notations in the matrix above (Pr and $P_r$, etc.).

Solving a system of n variables requires n equations, which brings us to the next step in the process.

Prototype Step 2: Resolve the Constraints

All logical constraints are resolved into mathematical equations that use the variables we have just created. We represent these equations as vectors. The first step in creating these vectors is resolving the ConstraintTargets. We build the appropriate vector based on the property, after looking up the tuple of variables associated with the element name.

For example,

<ConstraintTarget Property="Left" Name="S"/>=>[0 0 1 0 0 0].

"S" maps to the variables 2 and 3. 2 is the left variable, so we have a one at that index. Multiplying this vector with the variables shows that this is correct; the multiplication yields Sl.

Not all ConstraintTargets resolve to a vector with single element. Consider the following ConstraintTarget:

<ConstraintTarget Property="Width" Name="T"/>=>−Tl+Tr=[0 0 0 0 −1 1]

Once the ConstraintTargets are resolved to vectors, they are combined to form an equation. In a BinaryConstraint, LHS=Scale*RHS+Offset, so the first constraint in the collection,

```
<BinaryConstraint Offset="70">
    <BinaryConstraint.LHS>
        <ConstraintTarget Property="Left" Name="S"/>
    </BinaryConstraint.LHS>
    <BinaryConstraint.RHS>
        <ConstraintTarget Property="Left" Name="P"/>
    </BinaryConstraint.RHS>
</BinaryConstraint>
resolves to
LHS = 1*RHS + 70
LHS − RHS = 70
[0 0 1 0 0 0] − [1 0 0 0 0 0] = 70 => [−1 0 1 0 0 0 | 70]
```

EqualityConstraints are more complicated than BinaryConstraints. They can have any number of targets and come in two varieties: those that specify a constant value and those that do not. The second constraint in the collection is an example of an equality constraint that does not have constant value.

```
<EqualityConstraint>
    <ConstraintTarget Property="Left" Name="S"/>
    <ConstraintTarget Property="Left" Name="T"/>
</EqualityConstraint>
```

In this case, all ConstraintTargets are set equal to the first target. So if an equality constraint has n targets, then it will resolve into n−1 vectors. The resolution of the constraint above looks like this:

first=second

[0 0 1 0 0 0]=[0 0 0 0 1 0] [0 0 1 0 0 0]−[0 0 0 0 1 0]=0=>[0 0 1 0 −1 0]

An EqualityConstraint with a specified constant looks like this:

```
<EqualityConstraint Value="100">
    <ConstraintTarget Property="Left" Name="S"/>
    <ConstraintTarget Property="Left" Name="T"/>
</EqualityConstraint>
first = 100
second = 100
=> [0 0 1 0 0 0 | 100]
=> [0 0 0 0 1 0 | 100]
```

Notice that an equality constraint with n targets and a constant resolves into n vectors. The fact that there is not a one to one relationship between constraints and vectors is significant, especially at design time. It means that it is not possible to create a unique constraint collection from a given set of vectors.

Once we have resolved all the constraints we get the following system:

$$\begin{bmatrix} 1 & 0 & 0 & 0 & 0 & 0 \\ -1 & 1 & 0 & 0 & 0 & 0 \\ -1 & 0 & 1 & 0 & 0 & 0 \\ 0 & 0 & 1 & 0 & -1 & 0 \\ 0 & -1 & 0 & 0 & 0 & 1 \\ 0 & 0 & 2 & -2 & -1 & 1 \end{bmatrix} \begin{bmatrix} P_l \\ P_r \\ S_l \\ S_r \\ T_l \\ T_r \end{bmatrix} = \begin{bmatrix} 0 \\ 640 \\ 70 \\ 0 \\ -300 \\ 0 \end{bmatrix}$$

In this system,
P.Left=0 (Implicit)
P.Width=640 (Implicit)
S.Left=P.Left+70
S.Left=P.Left
T.Right=P.Right−300
T.Width=2*S.Width Recall that the size of the matrix will be 4n+4×4n+4, where n is the number of children in the panel. This matrix is half that size, since we are considering only the horizontal constraints. Though it is not immediately apparent in such a small example, the constraint matrix is sparse. The user cannot enter arbitrary vectors, as they are created from the constraints, which involve a maximum of four variables. (This occurs when a constraint relates two length properties such as Width and Height. The last row of the above matrix is an example of this.) Consequently, the matrix has a maximum of 8n+6 nonzero entries. Sparse vectors are presumed in a case like this.

Prototype Step 3: Build the Adjacency Matrix

Sparse vectors allow us to quickly discover what variables are in a given row of the matrix. However, we have not addressed the reverse relationship; given a variable we do not have a quick way to discover which vectors it appears in. In other words, we have sparse access to the rows of the matrix, but not the columns. The following function remedies this.

```
List<ConstraintVector>[ ] BuildRelatedConstraints(ConstraintVector[ ] vectors)
    List<ConstraintVector>[ ] adjacent = new List<ConstraintVector>[vectors.Length]
    foreach ConstraintVector cv in vectors
        foreach nonzero entry i in cv
            if (adjacent[i] == null)
                adjacent[i] = new List<ConstraintVector>( ) { cv }
            else
                adjacent[i].Add(cv)
    return adjacent
```

This approach may look $O(n^2)$, but in our case each ConstraintVector has at most four entries, making this function $O(4n)=O(n)$. The result in our example is a table something like the one below. The entries are actually references, not indexes, but the integer indexes are more illustrative; we can see that Sl appears in the second, third, and fifth vector.

| Pl | Pr | Sl | Sr | Tl | Tr |
|---|---|---|---|---|---|
| 0 | 1 | 2 | 5 | 3 | 4 |
| 1 | 4 | 3 |   | 5 | 5 |
| 2 |   | 5 |   |   |   |

Prototype Step 4: Solve the System

Gaussian elimination is used, altered to work on the sparse data structures. The idea is to pick a single equation for a given variable and then replace all occurrences of that variable with the equation. So if we choose to substitute Sl with Sl=Pl+70, then the other equations would be Pl+70=Tl and 2(Pr−Pl)=Sr−Pl+70.

Code such as the following can be used:

```
ConstraintVector[ ] Solve(ConstraintVector[ ] vectors)
    List<ConstraintVector>[ ] relatedConstraints =
BuildRelatedConstraints(vectors)
    ConstraintVector[ ] substitutions = new
ConstraintVector[vectors.Length]
    let sortedList = vectors sorted in ascending order by number of
nonzero entries
    for each ConstraintVector c in sortedList
        let fi = the index of the first nonzero entry in c
        normalize c
        substitutions[fi] = c
        // Eliminate the variable at fi from all other vectors that contain
        it foreach rv in relatedConstraints[fi] such that rv != c
            rv += (−1.0 * rv[fi]) * c
            UpdateRelatedConstraints(ref relatedConstraints)
    return substitutions
```

Sorting the vectors by the number of nonzero entries is not necessary for correctness, but failure to do so creates more "fill-in." Fill-in occurs when an entry in sparse vector becomes nonzero. For example, if 1 is a vector representing a=b+50 and v2 is the vector for c−a=0, then substituting v1 into v2 will result in c−b=50; v2 is now determined by c and b, instead of c and a, so we have filled in a variable that was previously zero in v2, namely b. The more fill in there is, the more we lose the efficiency of having a sparse system. By substituting the vectors with fewer variables into the equations with more variables, we can reduce fill-in. However, this strategy will not eliminate fill-in altogether; thus we still use the method UpdateRelatedConstraints( ) to do the bookkeeping to ensure that the related constraints are up to date.

The sort put the vectors into one of four buckets based on the number of nonzero values in the vector and then enumerates over them. This is O(n) instead of O(n log n).

Even in an underconstrained system, the result of Solve( ) is a matrix in reduced row echelon form (almost—the order of the vectors is a little different). This basically means that substitutions[i] will return the equation for the $i^{th}$ variable. This structure is helpful for the design time algorithms.

In a variation, one approach is to use a sparse matrix data structure. This would not necessarily improve performance, but could encapsulate all the "related constraints" bookkeeping. Another variation would save memory by swapping rows instead of creating a substitutions matrix. In another variation, Solve( ) does not have side-effects on the input matrix, as it currently does.

Prototype Step 5: Measure and Arrange

The final step of the process now being discussed is to loop over all the children in the panel and call Measure(Size) and Arrange(Rect) on them using the rectangles from the solution. This is currently done in the ArrangeOverride( ) method on the ConstraintPanel. The call to Measure is made because some elements, such as TextBox, use the measure size (as opposed to the arrange rectangle) to layout their content. This step could be significantly more complex if one had more robust support for children that sized themselves, in which case the DesiredSize of the children would be fed back into the system.

As to other solvers, two alternative solvers were attempted before settling on the one presented above for the prototype. Microsoft Solver Foundation has a logic-based solver that worked, but performance was unacceptable for the prototype. MAPACK, a non-sparse linear equation solver, also had unacceptable performance. The deeper issue that trying these "black box" solvers revealed was the significance of deep diagnostic information in under-constrained and error cases. Designtime algorithms discover conflicts and work with "half-solved" systems; this was not possible using these solvers.

Additions to Expression Blend® code to support ConstraintPanel's designtime experience include a layout designer for ConstraintPanel, a toolbar-like window used for creating alignment constraints, and an artboard experience having adorners, feedback, ToolBehaviors, and live controls. ConstraintPanel's layout designer invokes the constraint solver. To facilitate this, the constraint solver is a class library that both Expression Blend® code and ConstraintPanel take a dependency on.

SetChildRect( ) in ConstraintPanel's layout designer does the following. Compare the new rectangle with child's previous position. Find which variables changed based on the differences between the rectangles. Walk the constraint graph to find all implicit constraints related to the changed variables. Remove all related implicit constraints. Solve the underconstrained system. Save the solution and adjacency matrix. Recall that solution[i] equals the equation for the $i^{th}$ variable. Add implicit constraints to the child such that it is positioned in the given rectangle. Maintain the solution and adjacency matrix. For all independent variables left in the system, add implicit constraints to put them back where they were, updating the working solution along the way.

Finding all related constraints is not as simple as building the adjacency matrix and looking up the vectors related to the variables. Doing this tells us what constraints are directly related, i.e. both constraints reference the same variable. However, it is possible for constraints to be indirectly related. Let's consider our running example:

| $P_l$ | $P_r$ | $S_l$ | $S_r$ | $T_l$ | $T_r$ |
|---|---|---|---|---|---|
| 0 | 1 | 2 | 5 | 3 | 4 |
| 1 | 4 | 3 |   | 5 | 5 |
| 2 |   | 5 |   |   |   |

If we wanted to find which constraints affect the right edge of S, looking in the Sr column of adjacency matrix is a good start. However, we can see that the fifth vector also appears in the columns for Sl, Tl, and Tr so we walk the graph where the variables are the nodes, and edges are constraint vectors. In our running example, imagine that the offset between S and the panel was an implicit constraint, and all the rest were explicit. If we are trying to find the implicit constraints related to the Tl or Tr, we may report the implicit offset on S.

Other observations about the prototype include the following.

As to equality constraints, if a tool deletes one, the tool may be required to replace it with multiple constraints. If one constraint is added, deleting multiple constraints may well be required. Both these cases change slightly depending on whether or not the equality constraint has a constant value.

As to some designtime considerations, some problems can only be solved at the mathematical level, but the final result is a list of logical constraints. Mapping between these was called for in the prototype. Multiconstraints, especially the ones without a constant, keep things from being one-to-one. Not all mathematical systems can be represented by the logical model.

Trying to make the implicit constraints too complicated creates difficulty. Setting the edges and lengths to constants can be complicated. Doing more may not be practical.

More generally, the designer experience described herein for various embodiments may be attained using any of a variety of fully featured constraint solvers. The original intent of the foregoing detailed design document was to explain the prototype solver, so it is skewed toward the technical details of that prototype solver. Subsequently solutions have since been prototyped using different solver technology (linear optimization) with favorable results. In short, a suitable designtime experience can be achieved using different solvers, so weight should be given primarily to the designtime process for resolving conflicts, rather than particularities of the solver, when considering embodiments.

Interactive design code 202 helps designers create constraints without conflict or redundancy. The design code determines whether a proposed layout constraint is incompatible with established constraints, receives a designer's selection of an incompatible constraint, and displays user interface elements in previews of alternate layouts having different constraints. A designer can interactively explore possible resolutions of constraint incompatibilities as soon as the constraints are detectable. The design code animates a transition between possible layouts, highlights the incompatible constraints, and hides the compatible constraints. A subset of constraints may be shown, such as only the recently added constraints and closely related constraints.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process of facilitating user interface design, the process comprising the steps of:

automatically determining during a design time phase that a proposed constraint on user interface element(s) is incompatible with a set of established constraint(s);

receiving during the design time phase a designer's selection of a selected constraint of the set of established constraint(s), the proposed constraint being determined by use of a constraint solver to be incompatible with the selected constraint, the determination made by using at least one of the following: a linear algebraic constraint solver, a linear optimization constraint solver, a nonlinear constraint solver, a logic-based constraint solver, a graph-based constraint solver;

highlighting at least two recently added valid replacement constraints, namely, at least two constraints which (a) are capable of being replaced by the proposed constraint such that a valid layout solution is achieved, and (b) are among the ten most recently established constraints; and displaying the user interface element(s) to the designer in at least one alternate layout scenario in which the selected constraint is removed and the proposed constraint is added.

2. The configured medium of claim 1, further comprising automatically animating a display to show a transition from a pre-resolution layout before the selected constraint is removed to a post-resolution layout after the selected constraint is removed and the proposed constraint is added.

3. The configured medium of claim 1, in which the proposed constraint is incompatible in that it is redundant, and wherein the process shows a visual identification of established constraints that fulfill the same role as the proposed constraint.

4. The configured medium of claim 1, in which the proposed constraint is incompatible in that it is conflicting, and wherein the process shows a visual identification of established constraints that conflict with the proposed constraint.

5. The configured medium of claim 1, further comprising visually highlighting at least one of the incompatible constraints.

6. The configured medium of claim 5, further comprising hiding compatible constraints from view.

7. The configured medium of claim 5, further comprising utilizing a heuristic constraint filter, thereby showing only a subset of valid replacement constraints, namely, incompatible constraints which are capable of being replaced by the proposed constraint such that a valid solution is achieved in the design layout.

8. The configured medium of claim 1, further comprising initially showing only closely related valid replacement constraints, where two constraints are "closely related" if there is a user interface element to which both constraints pertain.

9. A process of user interface design, the process comprising the following steps performed at design time:
adding user interface elements to a layout;
establishing layout constraint(s) on the user interface elements;
proposing another layout constraint, hereby designated the "proposed constraint", which is incompatible with the established constraint(s);
seeing incompatible established constraints highlighted in the layout, namely, seeing established constraints which are incompatible with the proposed constraint highlighted in the layout;
seeing at least two recently added valid replacement constraints highlighted, namely, at least two constraints which (a) are capable of being replaced by the proposed constraint such that a valid solution is achieved in the layout, and (b) were each established in the last five minutes;
selecting one of the incompatible established constraints, hereby designated the "selected constraint";
hiding compatible constraint(s) from view, thereby changing which constraint(s) are visible, not which constraints are imposed on the user interface element(s); and
viewing in response to the selection an alternate layout scenario in which the selected constraint is removed and the proposed constraint is added.

10. The process of claim 9, in which selecting one of the incompatible constraints is done by placing a cursor over that incompatible constraint by using a mouse, trackball, pen, or touchscreen.

11. The process of claim 9, further comprising viewing an animation of a visual representation of all the user interface elements whose layout characteristic(s) would be changed by removal of the selected constraint and/or by addition of the proposed constraint.

12. The process of claim 9, further comprising confirming replacement of the incompatible constraint(s) by the proposed constraint.

13. The process of claim 9, further comprising confirming retention of the incompatible constraint(s) and rejection of the proposed constraint.

14. The process of claim 9, in which the established constraint(s) on user interface elements include constraints on at least one of the following: element width, element height, element alignment, element centering, element margins, element padding.

15. A computer system comprising:
a logical processor;
a memory in operable communication with the logical processor;
user interface elements residing in the memory;
constraints on the user interface elements, also residing in the memory;
an interactive design code residing in the memory and having data and instructions configured to cause processor(s) to determine whether a proposed constraint on user interface element(s) is incompatible with a set of established constraint(s), to receive a designer's selection of an incompatible established constraint, and to display the user interface element(s) to the designer in at least one alternate layout scenario in which the selected incompatible established constraint is removed and the proposed constraint is added, and to highlight recently added valid replacement constraints, namely, constraints which are capable of being replaced by the proposed constraint such that a valid layout solution is achieved, and wherein each highlighted recently added valid replacement constraint X also satisfies at least one of the following criteria: X is among the ten most recently established constraints, X became an established constraint within the last five minutes, or X became an established constraint after the most recent time an alternate layout scenario was saved;
wherein the design code includes at least one of the following: a linear algebraic constraint solver, a linear optimization constraint solver, a nonlinear constraint solver, a logic-based constraint solver, a graph-based constraint solver.

16. The system of claim 15, in which the design code includes an algebraic constraint solver.

17. The system of claim 15, in which the design code includes a heuristic constraint filter.

18. The system of claim 15, in which the constraints include explicit constraints and implicit constraints.

19. The system of claim 15, wherein the design code further comprises data and instructions configured to cause processor(s) to animate a display to show a transition from a pre-resolution layout before the selected incompatible established constraint is removed to a post-resolution layout after the selected incompatible established constraint is removed and the proposed constraint is added.

20. The system of claim 15, wherein the design code further comprises at least one of the following:
data and instructions configured to cause processor(s) to visually highlight at least one incompatible established constraint;
data and instructions configured to cause processor(s) to hide from user view compatible constraints on the user interface elements.

* * * * *